United States Patent
Chumley et al.

(10) Patent No.: US 6,739,639 B1
(45) Date of Patent: May 25, 2004

(54) APPARATUS AND METHOD FOR ACCESSING AND EXTENDING A TRUCK BED

(75) Inventors: William M. Chumley, 3303 Green Pond Rd., Woodruff, SC (US) 29388; Kenneth D. Chumley, Woodruff, SC (US)

(73) Assignee: William M. Chumley, Woodruff, SC (US)

( * ) Notice: Subject to any disclaimer, the term of this patent is extended or adjusted under 35 U.S.C. 154(b) by 0 days.

(21) Appl. No.: 10/379,040

(22) Filed: Mar. 5, 2003

(51) Int. Cl.[7] ................................................. B60P 3/34
(52) U.S. Cl. .................. 296/26.08; 296/62; 296/26.11; 296/61
(58) Field of Search ................ 296/26.08, 62, 296/61, 64, 26.11, 26.1, 37.6; 280/166, 164.1; 410/104; 182/206, 127

(56) References Cited

U.S. PATENT DOCUMENTS

| | | | | |
|---|---|---|---|---|
| 4,021,071 A | * | 5/1977 | Norman | 296/62 |
| 4,191,388 A | * | 3/1980 | Barksdale | 296/62 |
| 4,194,754 A | * | 3/1980 | Hightower | 280/166 |
| 4,527,941 A | * | 7/1985 | Archer | 296/61 |
| 5,028,063 A | * | 7/1991 | Andrews | 296/62 |
| 5,205,603 A | * | 4/1993 | Burdette, Jr. | 296/62 |
| 5,549,312 A | * | 8/1996 | Garvert | 296/62 |
| 5,597,195 A | * | 1/1997 | Meek | 296/61 |
| 5,687,813 A | * | 11/1997 | Bensch | 280/166 |
| 5,732,996 A | * | 3/1998 | Graffy et al. | 296/62 |
| 5,788,311 A | * | 8/1998 | Tibbals | 296/26.11 |
| 5,941,342 A | * | 8/1999 | Lee | 280/166 |
| 6,270,139 B1 | * | 8/2001 | Simpson | 296/62 |
| 6,283,525 B1 | * | 9/2001 | Morse | 296/26.11 |
| 6,364,392 B1 | * | 4/2002 | Meinke | 296/26.1 |
| 6,422,342 B1 | * | 7/2002 | Armstrong et al. | 296/62 |
| 6,454,338 B1 | * | 9/2002 | Glickman et al. | 296/26.11 |
| 6,513,850 B1 | * | 2/2003 | Reed | 296/26.08 |
| 2002/0070577 A1 | * | 6/2002 | Pool et al. | 296/62 |
| 2002/0121794 A1 | * | 9/2002 | Vejnar | 296/26.11 |
| 2002/0164225 A1 | * | 11/2002 | Snyder et al. | 410/104 |
| 2002/0189903 A1 | * | 12/2002 | Krish | 182/206 |
| 2003/0188925 A1 | * | 10/2003 | Korpi | 182/127 |

* cited by examiner

Primary Examiner—Kiran Patel
(74) Attorney, Agent, or Firm—Dority & Manning P.A.

(57) ABSTRACT

Apparatus and method are illustrated for accessing, extending and exiting a truck bed and having a pair of opposed end frame members (A) carried on opposed respective sides of the truck preferably on a truck having a tailgate. A transverse member(B) is substantially U-shaped and constructed of tubular frame members and carried in such a way that the legs (C) are pivotally carried between the upright frame members. A releasable fastening member (D) is provided for positioning the transverse member in upright position while stop member (E) limits downward pivotal movement of transverse member.

14 Claims, 6 Drawing Sheets

APPARATUS AND METHOD FOR
ACCESSING AND EXTENDING A TRUCK
BED

BACKGROUND OF THE INVENTION

This invention relates to apparatus and method for use on pick up trucks and the like as original equipment or to be retrofitted for use on existing trucks for accessing and for extending the truck bed and to secure various objects, i.e., pipe, lumber, ladders, gas cans, etc., as well as for supporting the feet and lower legs of the user for comfort in sitting on a tailgate.

Many efforts have been made to solve the problem of providing convenient access to the bed of pick up trucks and the like. The following U.S. Pat. Nos. are illustrative of the prior art: U.S. Pat. Nos. 6,435,588, 6,422,630, 6,367,858, 6,193,294, 5,658,033. The various constructions illustrated in the patents are relatively expensive and complicated. None provide a simple practical solution to the problem of accessing a tailgate and for sitting thereon as for tailgate parties in such a way as to add to the comfort and well being of the user. Furthermore, none of the prior art patents show the use of a frame like device which serves to extend the bed of the truck and provide ready access to the tailgate by the user.

Various prior art constructions involve downwardly extending framework which is inconvenient for use in accessing the tailgate base or bottom of the frame is above the ground extending across the tailgate serving as a step for accessing the truck bed as well as to effectively extend truck bed for increased capacity and usefulness.

Additional prior art includes a U-shaped tubular frame extending downwardly and slightly rearwardly providing a transverse step above the ground and foldabily carried at free ends on one side of the tailgate. These folding tailgate steps are sold under the trademark Bed-Hopper by J. C. Whitney of JC Whitney Way LaSalle, Ill. 61301.

SUMMARY OF THE INVENTION

Accordingly it is an important object of this invention to provide a pivoted frame attached to a vehicle such as a pick up truck for downward pivotal movement against a stop member positioning a step rearwardly above the ground pivotally carried by free ends of frame members at each side of the bed of the truck for accessing the bed of the pick up truck.

An important object of this invention is to provide a simplified method for accessing the bed of a pickup truck to ascend and descend while positioning the feet of a user seated on a tailgate without leaving the legs of the user in a dangling position.

An important object of this invention is to provide an extended bed pickup truck with simplified frame construction which may be lowered to a rear inclined position above the ground to provide a step for accessing the vehicle while enlarging the capacity of the bed of a pickup truck.

A method and apparatus that is inexpensive and of simple construction is operatable to provide a convenient device for accessing a pickup flat bed and for extending the bed includes a pivotal frame connected between upright end frame members on opposite sides of the tailgate. The frame is pivoted at lower ends for downward movement to a position for receiving the foot of the user for stepping onto the bed while accessing and serving as an apparatus useful for extending and accommodating contents on a flatbed. The upright end frame members serve as handles to aid the user in sitting upon a tailgate comfortably with the feet and lower legs extending rearwardly at an angle of about 60° to the horizontal.

BRIEF DESCRIPTION OF THE DRAWINGS

The construction designed to carry out the invention will be hereinafter described, together with the other features thereof.

The invention will be more readily understood from reading of the following specification and by reference to the accompanying drawings forming a part thereof, wherein an example of the invention is shown and wherein.

DESCRIPTION OF A PREFERRED EMBODIMENT

Figure 1:
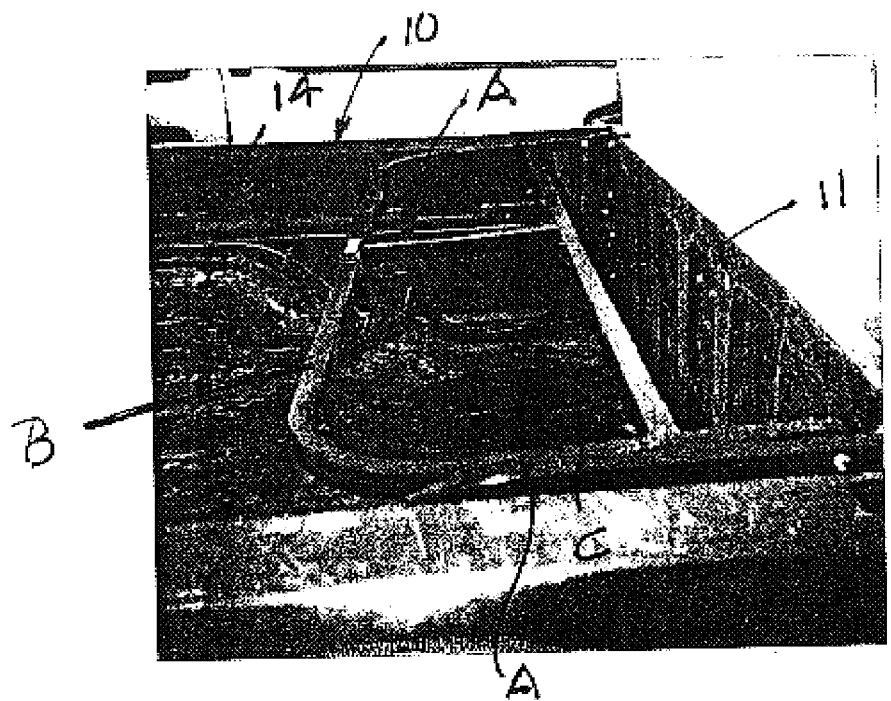
FIG. 1 is an end perspective view illustrating the tubular frame construction of the apparatus including opposed upright members as being folded in downward position within the truck so that the downwardly extending foot receiving member terminates short of the wheel well of the pickup truck.
Figure 2:
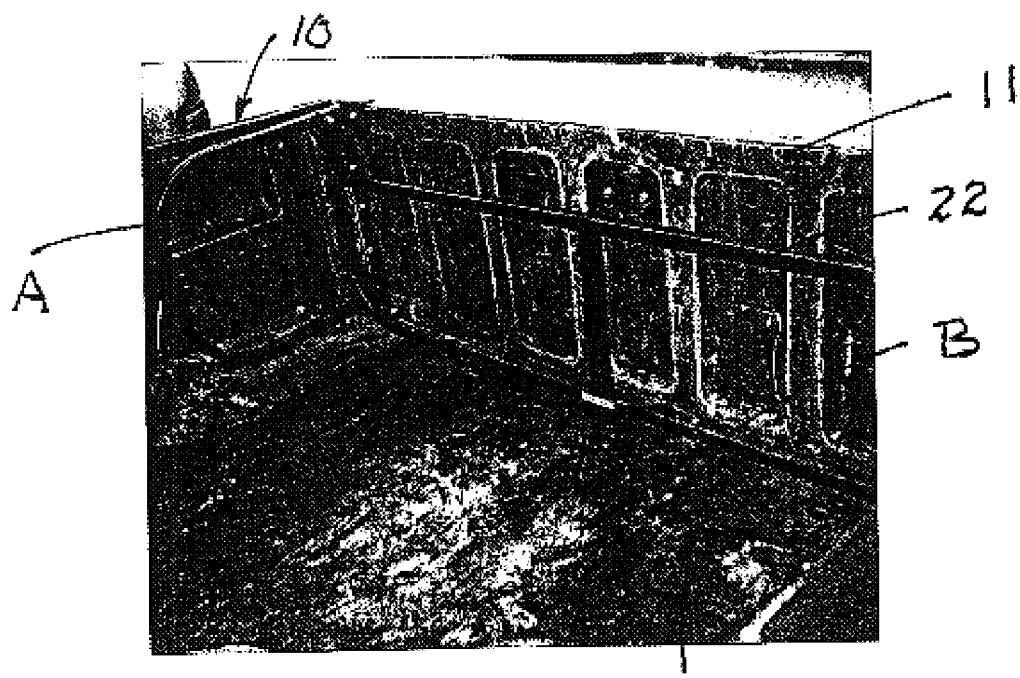
FIG. 2 is a left rear perspective view further illustrating the apparatus in folded position within a pick up truck.
Figure 3:
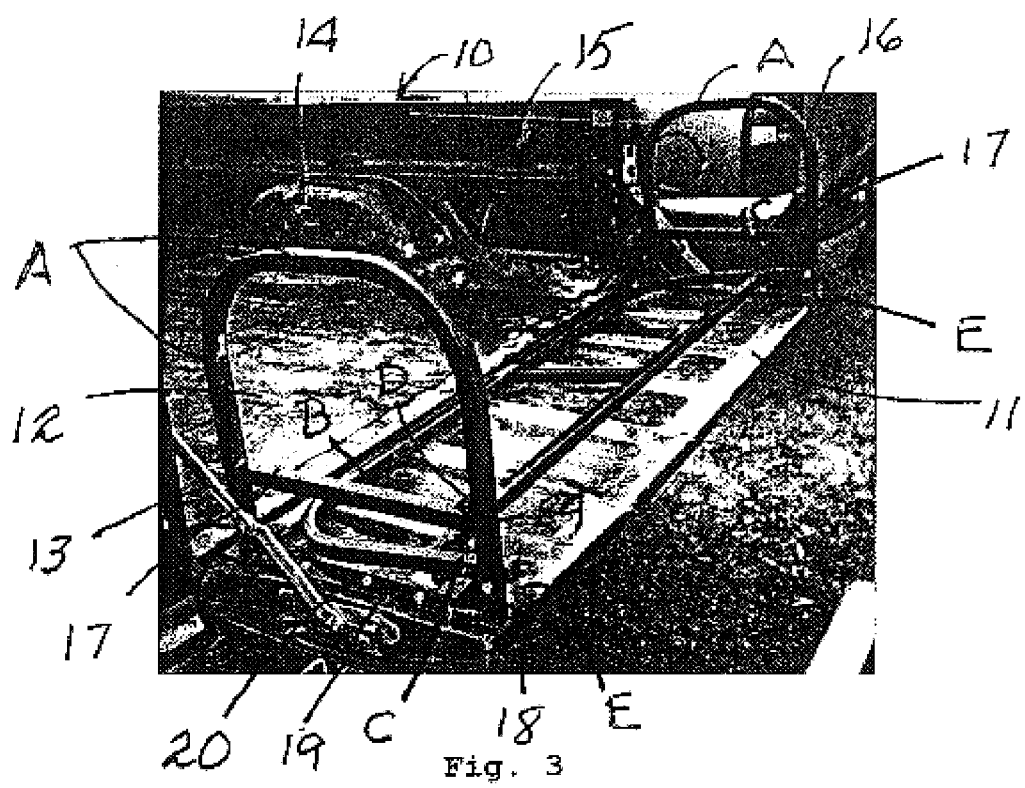
FIG. 3 is a left front perspective view illustrating the transverse frame member connected between the upright frame members supported by the tailgate by brackets carrying stop members.
Figure 4:
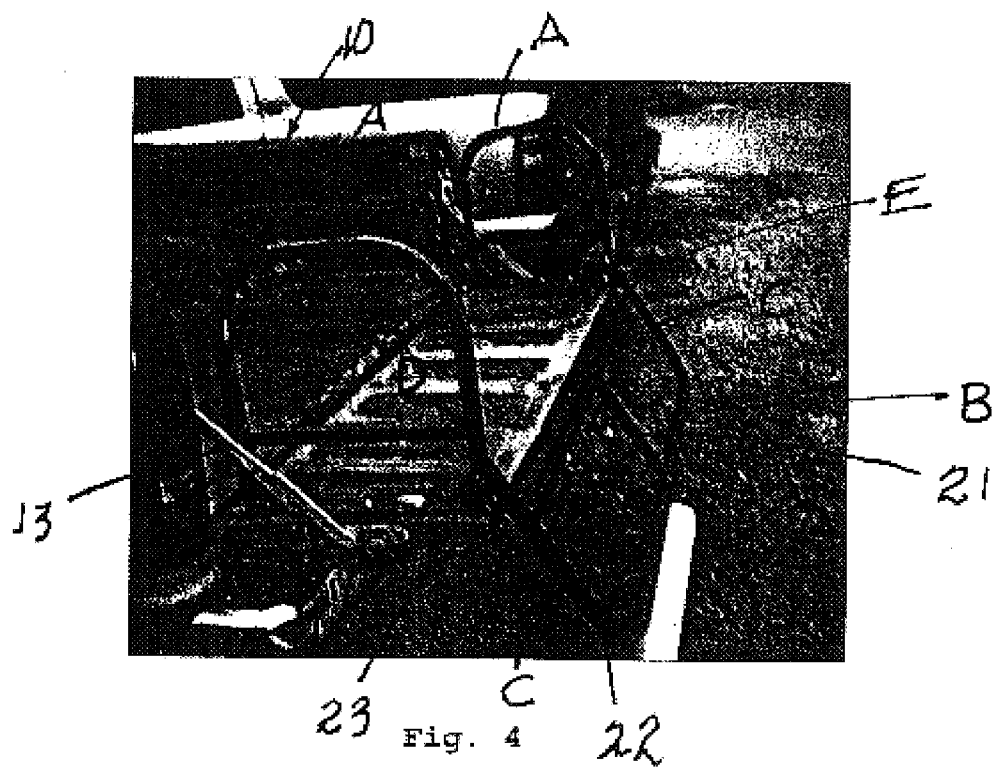
FIG. 4 is a left front perspective view illustrating the transverse frame member in lowered position for receiving a foot of the user.

The drawings illustrate an apparatus and method for accessing and extending a truck bed having a tailgate wherein a pair of opposed end frame members A are carried adjacent respective opposite sides of the tailgate. A transverse member B is constructed of a substantially U-shaped tubular frame member wherein the legs C of the U-shaped member act as end members for the transverse member B and are pivotally carried adjacent free ends between the end frame members adjacent a rear edge of the tailgate. A releaseable fastening member D fixes the transverse member in upright position on the tailgate. A stop member E limits downward pivotal movement of the transverse frame member when the fastening member is released for downward pivotal movement to an angular depending position extending rearwardly above the ground by an amount generally corresponding to a stair riser to receive a foot of the user when ascending onto the tailgate.

Thus, the end frame members serve as load retaining members and as handles to aid in accessing the truck. The transverse member B when in a upright position serves as a load retaining member and when in depending position as a foot receiving member to aid in accessing the truck bed and for supporting the feet and lower legs of the user for comfort in a seated position on the tailgate of the truck.

The drawings illustrate a pick up truck broadly designated at 10 having a tailgate 11 hinged to the bed 12 of the pick up. A folding hinge 13 supports the tailgate in lowered horizontal position. The pick up truck has wheel wells 14 carried between respective sides 15 of the pick up truck. Opposed frame members A are constructed of U-shaped tubular members 16 that carry a base member 17 adjacent to lower free ends. The free ends of the end frame members A are secured as by brackets 18 mounted on side frame members 19 fastened as by screws 20 to the sides of the tailgate.

The transverse member B extends substantially from one side to the other across the tailgate and is also illustrated as being of tubular construction. A center support of tubular construction is illustrated at 21 whereas a support member 22 is transversely carried between a lower portion of the legs. The legs C are pivotally mounted adjacent to spaced brackets as at 23. A releaseable fastening member D is illustrated in the form of sleeve having a bore 24 extending from one end to the other to accommodate a pin 25 illustrated in FIG. 5 that is provided with a head (not shown) on one end and cotter pin 26 for retention within the transverse bore 24 and within a complimentary member (not shown) on the legs C.

A stop member E has attachment to the bracket 26 and may be of an angular configuration extending inwardly of each side along the rear edge of the tailgate 11.

Figure 5:
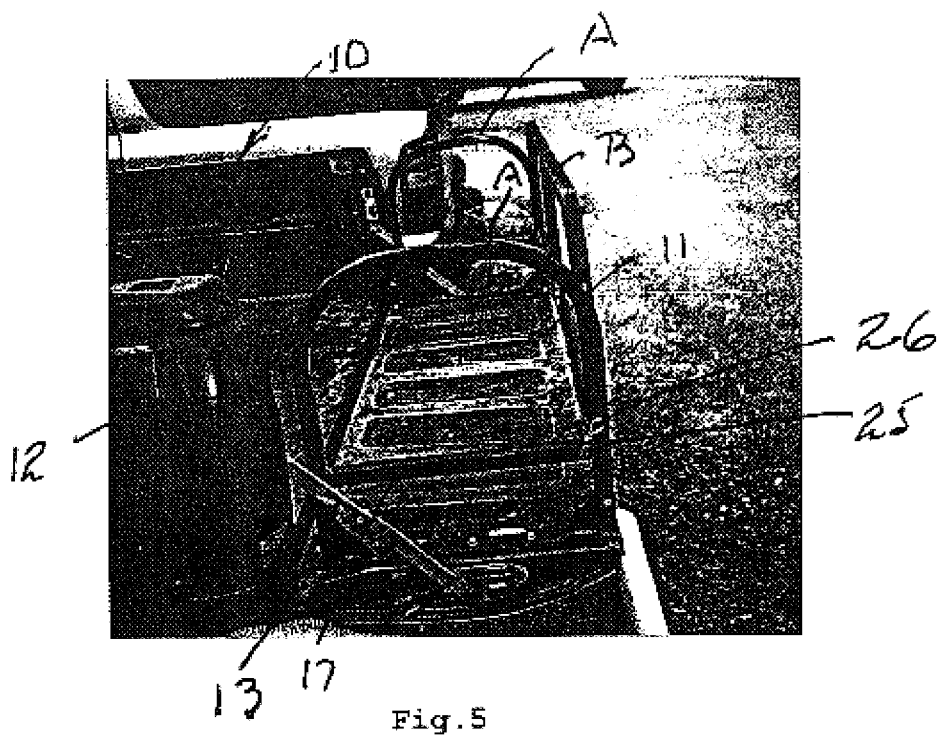
FIG. 5 is an end perspective view illustrating a fastening mechanism for securing the transverse frame member in upright position.
Figure 6:
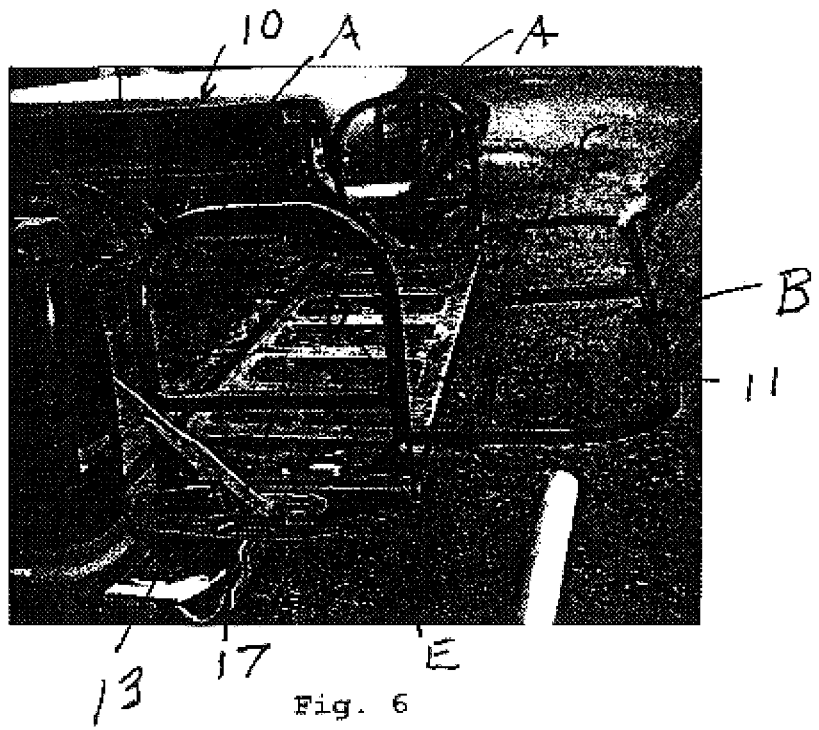
FIG. 6 is a left rear view illustrating the frame in horizontal position for retaining articles on the truck bed.

The end frame members A also serve as load retaining members and are especially useful as handles to aid a user when accessing bed of the pick up truck. The transverse member B when in upright position as illustrated in FIG. 5 serve as confinement members to extend bed of the truck and to retain articles in position for transport upon the bed.

Figure 7:
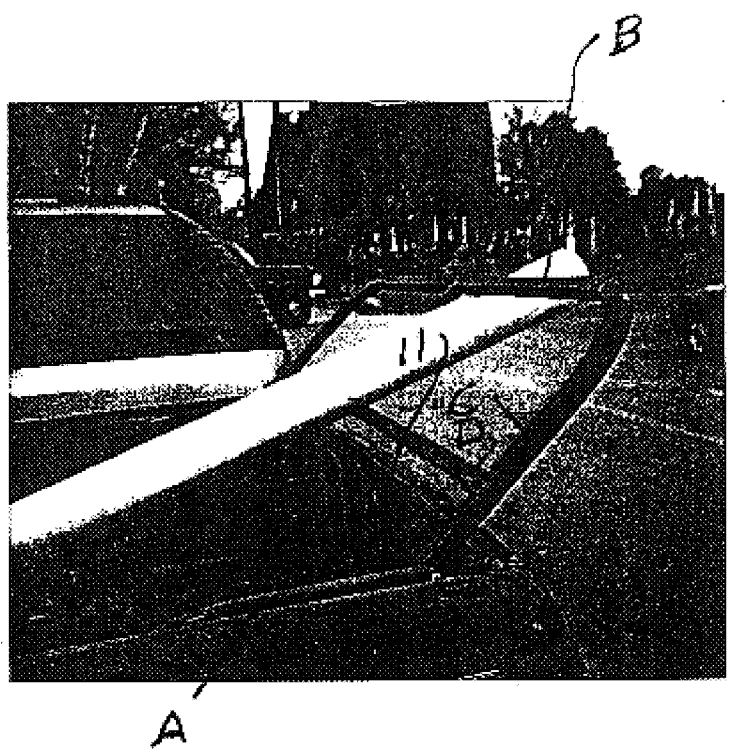
FIG. 7 is a left rear perspective view illustrating the use of the frame member in partially raised position supporting a load upon the truck bed.
Figure 8:
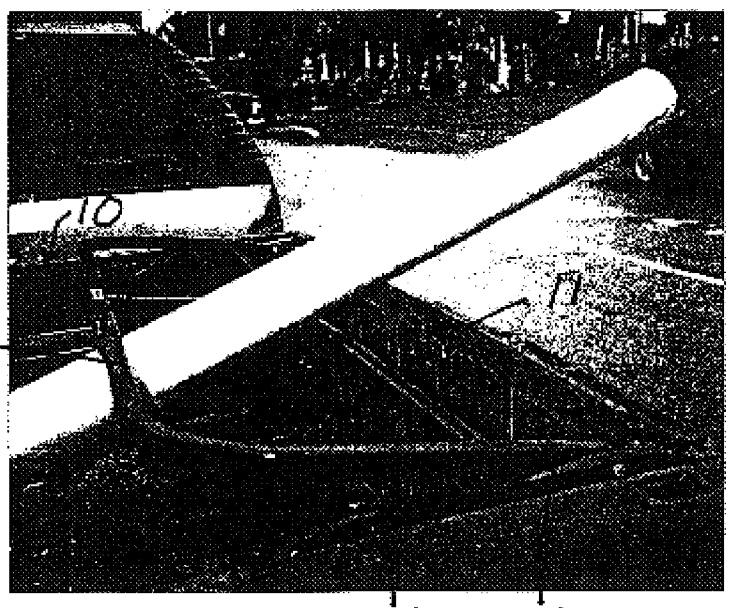
FIG. 8 is left rear perspective view illustrating a lowered position for the transverse bar to further facilitate load handling on the truck bed.
Figure 10:
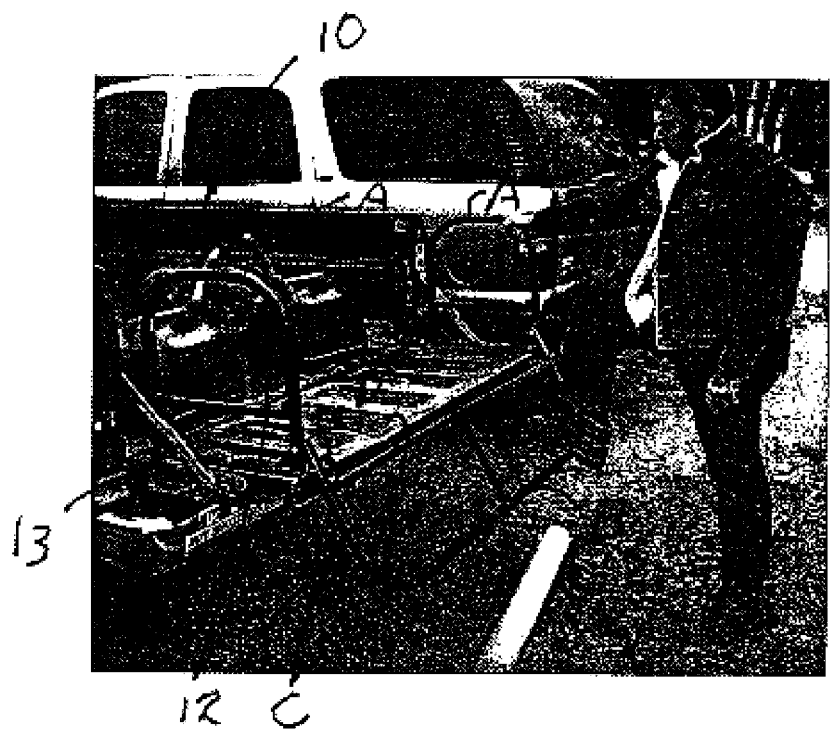
FIG. 10 is a left front perspective view illustrating the use of the transverse bar when in lowered position for accessing the truck bed as a step member.
Figure 11:
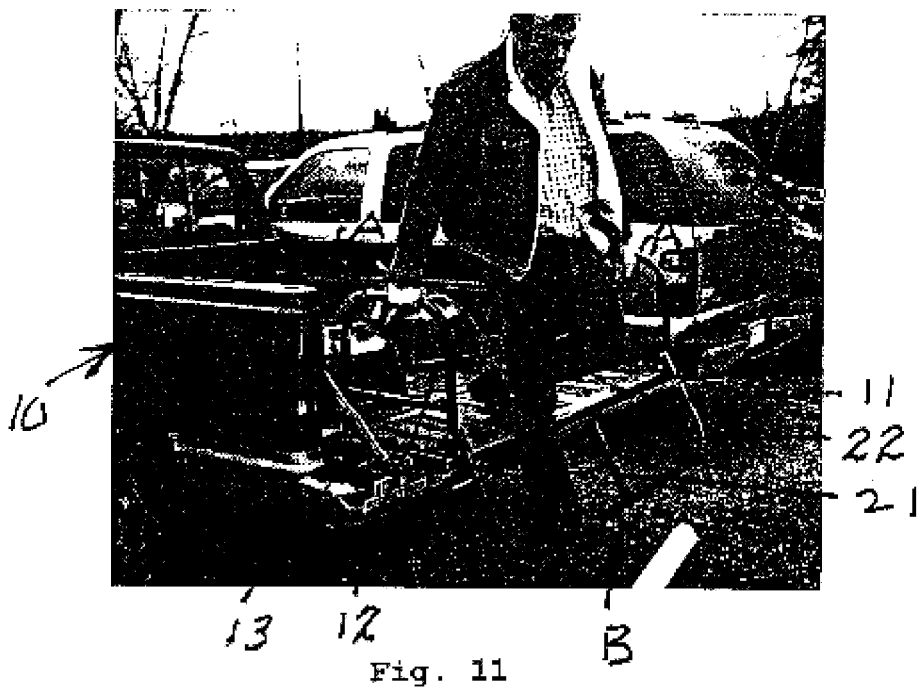
FIG. 11 is a left front perspective view illustrating the use of the transverse frame to receive a users foot for descending from bed of truck.
Figure 12:
FIG. 12 is a left front perspective member illustrating the transverse frame member when in lowered position used to accommodate the feet of user.

When in depending position the transverse foot receiving member B serves as an aid in accessing a truck as illustrated in FIG. 10 and for supporting the foot and lower legs of user for comfortable seating on the tailgate of the truck. It has been found the that a suitable angle for maximum comfort by many adults is approximately 60° more or less with the horizontal angle being dictated by comfort of the user. FIG. 11 illustrates a user placing a foot on the transverse member while utilizing the handles for coming to a seated position as shown in FIG. 12 or as an aid in exiting from the tailgate. FIGS. 7 and 8 illustrate a mode of using the transverse foot receiving member as a bed extension for carrying elongated members including pipe sections and the like.

Figure 9:
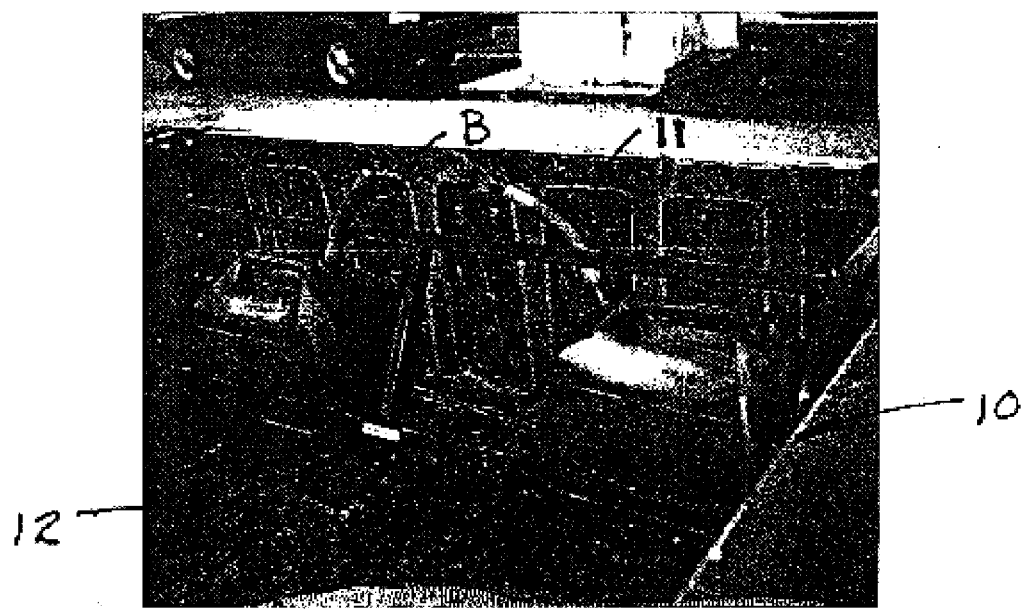
FIG. 9 is a left rear view illustrating the transverse member in use to position objects against the raised tailgate trailer for transport.

FIGS. 9 and 10 illustrate the use of a transverse member for portioning articles within the pickup truck as illustrated by the gas cans shown in FIGS. 9 and 10.

While preferred embodiment of the invention has been described using specific terms, such description is for illustrative purposes only, and it is to be understood that changes and variations may be made to achieve additional uses as well as to utilize various construction material and configurations without departing from the spirit or scope of the following claims.

What is claimed is:

1. Apparatus for accessing and extending a truck bed having a tailgate comprising:

A pair of opposed end members carried adjacent respective opposite sides of said tailgate;

a transverse member extending between the end frame members adjacent a rear edge of the tailgate;

a pair of spaced legs carrying said transverse members therebetween;

a pivotal connection between respective end members and legs permitting limited downward movement of said transverse member; and a stop member limiting said downward pivotal movement of the transverse member to an angular depending position extending rearwardly above the ground by an amount generally corresponding to a stair riser to receive the foot of a user;

whereby the transverse member when in a vertical position serves as a load retaining member and when in depending position as a foot receiving member to aid in accessing the truck bed and to support the lower legs in an outwardly extending position during transport.

2. The apparatus set forth in claim 1 wherein said end members extend upwardly on opposite sides of the tailgate and provide a pivotal connection to the respective transverse member.

3. The apparatus set forth in claim 1 wherein said transverse member and said legs comprise an integral substantially U-shaped member.

4. The apparatus set forth in claim 3 wherein said end members extend longitudinally at each side of the tailgate providing containment for contents on the truck bed and serving as handles to aid the user in ascending upon the truck.

5. The apparatus set forth in claim 4 wherein said end members support said transverse member when pivoted to upright position for containment of articles in the truck.

6. Apparatus for accessing a truck bed having a tailgate comprising:

a transverse member pivotally carried at each end adjacent a side and a rear edge of the tailgate extending across and the tailgate; and a stop member limiting downward pivotal movement of the transverse member to an angular depending position extending rearwardly above the ground by an amount generally corresponding to a stair riser to receive the foot of a user;

whereby the transverse frame member when lowered to said depending position serves as a step to aid in accessing the said depending position serves as a step to aid in accessing the truck bed and as support for the feet and lower legs of a user during transport.

7. The apparatus set forth in claim 6 wherein said transverse member is a substantially U-shaped tubular frame member; and an upright tubular end members carried at each side of the tailgate providing a pivotal mounting for said tubular frame member and a handle for aiding the user in ascending to the tailgate.

8. The apparatus set forth in claim 7 including brackets carried at rear edges of the tailgate on each side for supporting said upright end members, and for serving as a stop member limiting downward pivotal movements of said transverse member.

9. The apparatus set forth in claim 6 wherein said transverse member depends at an angle of about 60° to the horizontal.

10. The apparatus set forth in claim 8 including a fastener carried by said upright tubular members for securing the transverse member in upright-position.

11. The apparatus set forth in claim 10 including end frame members secured to the tailgate acting as a frame for supporting said brackets on the tailgate.

12. A method for accessing a truck bed having a tailgate comprising the steps of:

lowering a transverse frame member pivotally carried between the sides of the tailgate; and limiting the extent to which the transverse frame member is lowered to an angular depending position extending rearwardly above the ground by an amount generally corresponding to a stair riser to receive a foot of a user affording support for the user in ascending to a seated position on the tailgate; and utilizing the transverse frame member as a support for the feet of the user when the user is seated upon the tailgate and facing rearwardly.

13. The method set forth in claim 12 including the steps of:

extending the transverse frame member across a rear edge of the tailgate for pivotal movement at each end; and utilizing a bracket carried adjacent the rear edge as a stop limiting downward pivotal movement of the transverse frame member.

14. The method set forth in claim 12 including the step of providing an upright handle for aiding the user in gaining access to the truck bed and as a further support for the user for transport when seated on the tailgate.

* * * * *